Figure 3:
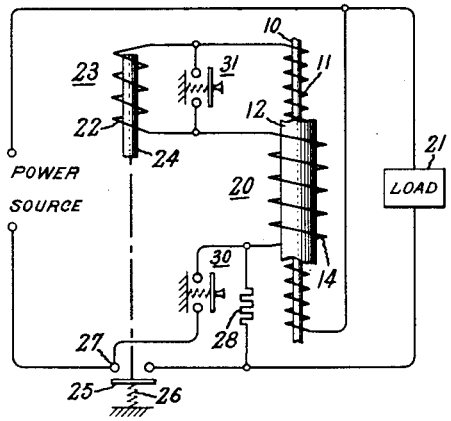

Aug. 28, 1951        G. C. CROWLEY        2,565,478
TEMPERATURE RESPONSIVE CONTROL CIRCUITS
Filed May 4, 1949        3 Sheets-Sheet 1
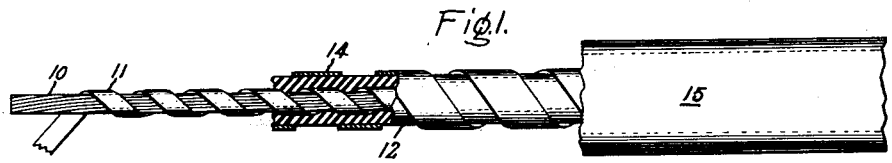
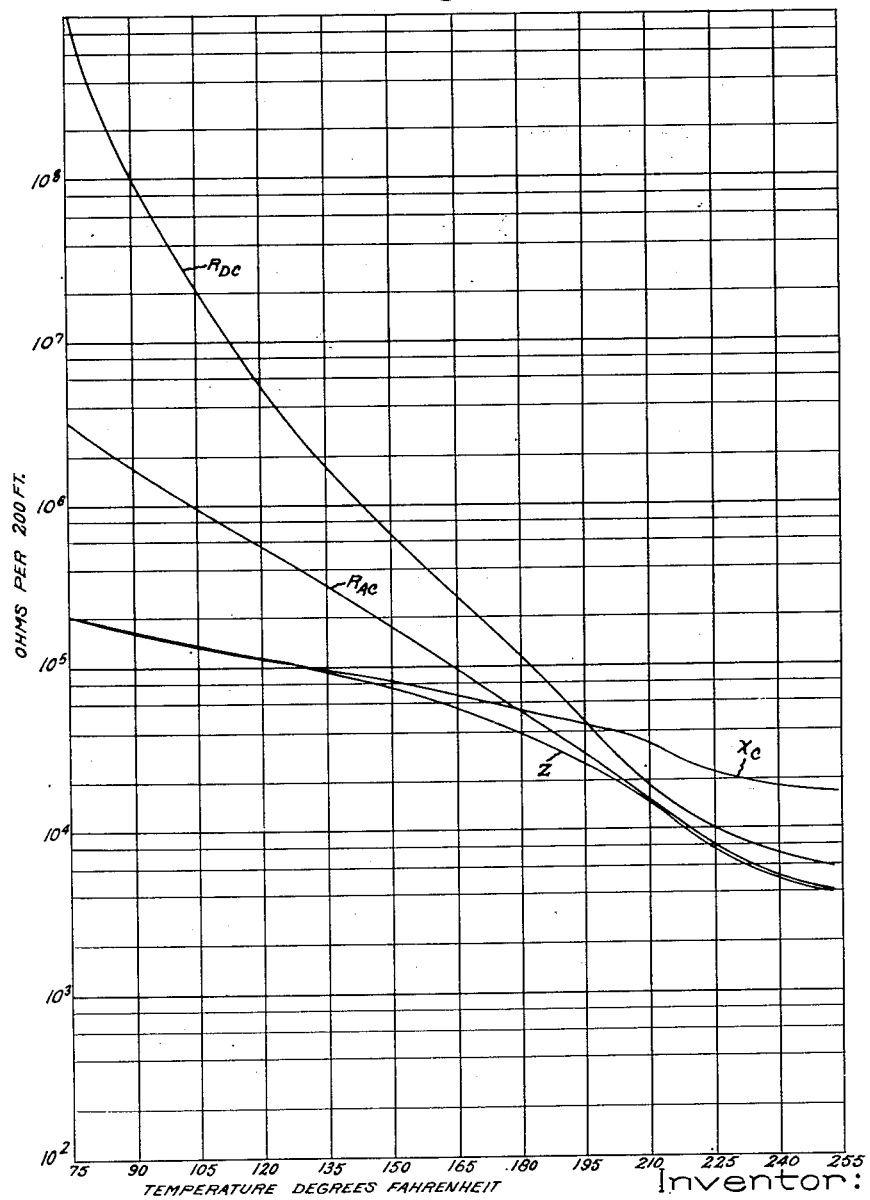
Inventor:
George C. Crowley,
by Sheridan... Beggs
His Attorney.

Aug. 28, 1951  G. C. CROWLEY  2,565,478
TEMPERATURE RESPONSIVE CONTROL CIRCUITS
Filed May 4, 1949  3 Sheets-Sheet 2

Inventor:
George C. Crowley,
by *Sheridan & Begg*
His Attorney.

Aug. 28, 1951 G. C. CROWLEY 2,565,478
TEMPERATURE RESPONSIVE CONTROL CIRCUITS
Filed May 4, 1949 3 Sheets-Sheet 3
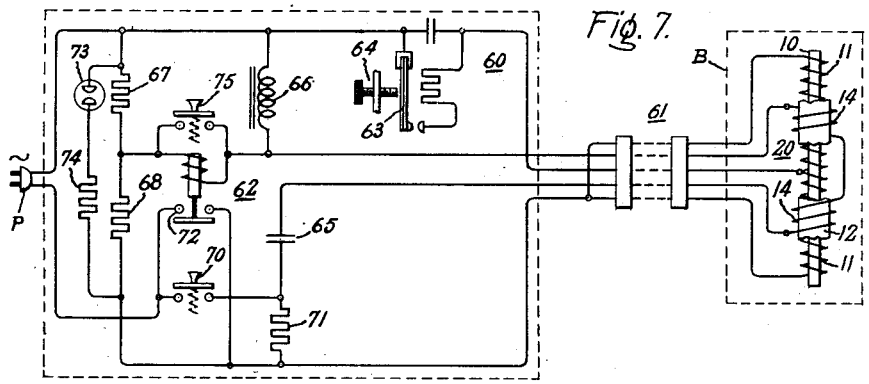
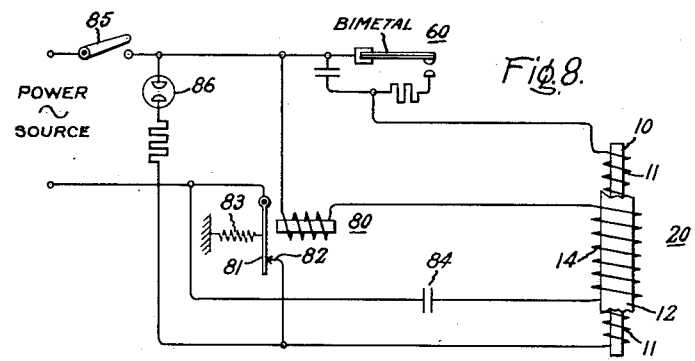
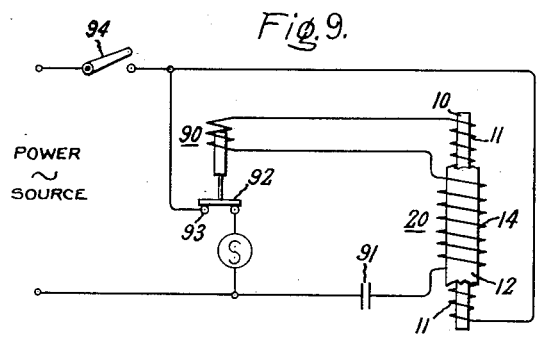
Inventor:
George C. Crowley,
by *Sheridan Leib Begg*
His Attorney.

Patented Aug. 28, 1951

2,565,478

UNITED STATES PATENT OFFICE 2,565,478

TEMPERATURE RESPONSIVE CONTROL CIRCUITS

George C. Crowley, Bridgeport, Conn., assignor to General Electric Company, a corporation of New York Application May 4, 1949, Serial No. 91,402

14 Claims. (Cl. 219—20)

This invention relates to electric circuits for operating a work device in response to the temperature change of a thermosensitive structure embodying a control material which over a known temperature range exhibits predictable changes in one or more electrical characteristics.

Control circuits embodying this invention may be used to excellent advantage in association with a thermosensitive structure as disclosed and claimed in the pending application of Spooner et al., S. N. 91,396 filed May 4, 1949, for Thermosensitive Devices and Apparatus Incorporating the Same and assigned to the assignee herein; that structure per se is the invention of David C. Spooner, Jr. and Milton S. Greenhalgh, and I, therefore, do not claim such structure per se. But I do claim such a structure as one of the elements in the combination which is my invention. The structure described and claimed in the Spooner et al. application is highly flexible, of small diameter, and may be made and used in substantial lengths coextensive with the windings of a motor, for example, or a heating element such as the heater wire of an electric blanket; or it may be arranged in three-dimensional pattern throughout a bin or the like for response to temperature of the contents thereof. The Spooner et al structure includes a pair of wire-like electrodes of indefinite length separated by a coextensive control layer of an organic material, such as a polyamide, which exhibits with change in temperature, a marked change of certain electrical characteristics, among which are resistance and impedance. For example nylon, a typical polyamide, has a temperature resistance coefficient such that at temperatures of the order of 100° F. it is to all practical purposes an insulator, whereas at a predetermined elevated temperature it will conduct significant current between its electrodes. Control circuits disclosed in the instant application are adapted to respond to the change in one or more electrical characteristics accompanying temperature change of even a small portion of the total length of the thermosensitive element, anywhere along the length thereof. The subject matter of this application is also related to that of the copending application of J. W. McNairy, S. N. 134,002, filed December 20, 1949, which is assigned to the assignee herein. The subject matter of this application is further related to that of the copending application of R. G. Holmes, S. N. 208,965, filed February 1, 1951, which is assigned to the assignee herein.

A typical work device may comprise an electromagnetic relay or equivalent arranged to be energized or de-energized according to the temperature of the thermosensitive element with respect to the control level of temperature. Operation of the device pursuant to the change in control layer conductivity or change in alternating current impedance of the control circuit may be accomplished in numerous ways; the several circuits shown in the accompanying drawings are merely by way of example. In certain of said circuits the maintenance of a closed load circuit condition is dependent upon the continued energization of the relay or its equivalent. Where the systems are to protect against overheating, such circuits provide "fail safety" in that any interruption of the relay energy circuit will open the load circuit. The obviously alternative way of requiring relay energy to open the load circuit would be appropriate, for example, in installations where instead of overheat protection the objective was to prevent temperatures from dropping below a predetermined minimum, in which event failure of relay energy would maintain the heat source operative. Certain of my control systems place the relay or other control device in a resonant circuit pursuant to which a predetermined peak voltage at resonance will energize the control device and de-energization will occur only within a relatively narrow, predictable, temperature range at which the circuit will be so loaded because of control layer conduction as to go off resonance.

It is therefore an object of my invention to provide a temperature responsive control circuit which is sensitive to temperature changes within a relatively narrow range while embodying simple, rugged, component devices conducive to low manufacturing costs, reliability in operation, and easy maintenance.

It is another object of the invention to provide a control circuit which is predictably responsive to the change in one or more electrical characteristics resulting from the change in temperature of a body of material disposed between a pair of electrodes to maintain the same in fixed spaced relationship.

It is still another object of the invention to provide an improved control circuit for use in electric blankets and the like.

Figure 4:
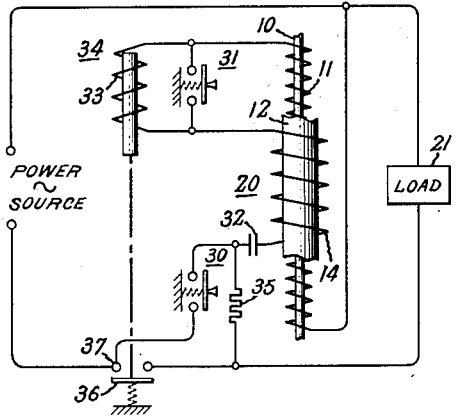
Figure 5:
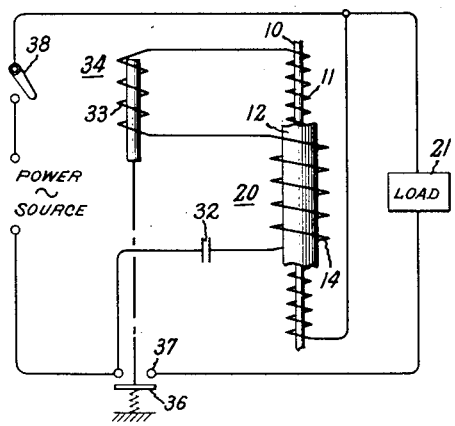
Figure 6:
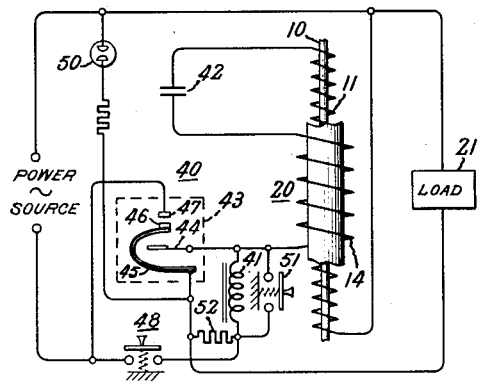

Other features and advantages of the invention will be apparent from the following detailed description of respective control circuits, taken in connection with the accompanying drawings in which Fig. 1 is a partial section of a typical temperature sensitive control element disclosed and claimed in the said pending application S. N. 91,396 filed by Spooner et al.; Fig. 2 is a set of curves showing change with temperature of direct current resistance (R$_{DC}$) alternating current resistance (R$_{AC}$) capacitive reactance (X$_C$) and impedance (Z) of a two hundred foot specimen of thermosensitive element as disclosed in said Spooner et al. application; Fig. 3 is a circuit diagram of one form of control in which the work device will be shunted out by electrical conduction through the control layer of the thermostat element upon predetermined temperature increase thereof; Fig. 4 is a control circuit in which the work device is placed in a resonant circuit including both of the electrodes of the thermosensitive device; Fig. 5 is a control circuit in which the impedance of the relay constitutes an element of the resonant circuit and in which cycling overheat control is provided; Fig. 6 is a circuit embodying the use of a thermal glow switch in lieu of a conventional relay; Figs. 7 and 8 illustrate control circuits in which the load constitutes one of the electrodes of the thermosensitive element and the work device is in a resonance circuit including the second electrode; and Fig. 9 is a circuit in which the work device comprises means for signalling temperature rise of any object or mass of material with which the thermosensitive device may be placed in heat exchange relation.

As shown herein by way of examples of embodiments of my invention, the control circuits include a thermosensitive element, a switch for controlling a load circuit, and means such as an electromagnetic coil, a glow discharge device or the like for operating said switch. The load circuit may include a motor, motor starting relay, heat coil, or the like, or any other electrically energized device. In some installations, the objective may be to operate the control in response to abnormal temperature rise of the load circuit itself, as in the case of protection of motor or generator windings, or protection of an electrically heated blanket or the like against scorching temperatures. In others, it may be desired to operate a warning signal, or cooling or ventilating apparatus, for example, in the event that the air temperature of an enclosure, or the internal temperature of a mass of material, rises to a predetermined point. In any event, the thermosensitive device is installed in heat exchange relation with the associated object or equipment.

A typical thermosensitive element disclosed in the Spooner et al. application used with the circuits hereinafter described comprises, see Fig. 1, a flexible insulating core or strand 10 on which is wound a ribbon-like electrode 11. Over said electrode in intimate surface contact therewith is a thin control layer 12 of organic material such as nylon, which at temperatures between 80° and 100° F. has such a high unit resistance as to be to all practical purposes an insulator, but at double those temperatures and above, its resistance and impedance drops sufficiently for conduction of significant current at usual domestic potentials of 115 volt. A.-C. or D.-C. Wound tightly on the control layer so as also to be in close surface contact, is a second electrode 14 which is coextensive with the first. An outer cover 15 of suitable insulation material completes the assembly. A thermosensitive element embodying this construction may be made in any desired length, and in commercial form has maximum diameter of the order of $\frac{1}{10}$ of an inch.

Fig. 2 shows changes in direct current resistance (R$_{DC}$) alternating current resistance (R$_{AC}$) capacitive reactance (X$_C$) and impedance (Z) of the nylon control layer in a two hundred foot length of Spooner-Greenhalgh control wire as manufactured for use in electric blankets and the like. It will be noted that over a range of from 75° to 255° F. the D.-C. resistance of the control layer drops from about 10$^9$ ohms to about 6000 ohms; that the A.-C. resistance drops from about three million ohms to about 4000 ohms, and that the impedance drops from about 200,000 ohms to about 4000 ohms. It will be noted that the gradient of the impedance drop is sharpest in the 195° F. to 240° F. range, which is that in which blanket control circuits are intended to operate. It will also be noted that the slope of the curves remains downward at 255° F., indicating still lower values at higher temperatures which are nevertheless below the softening point of nylon, which is above 500° F.

Generally speaking, I prefer to operate my control circuits and systems with alternating current because of the superior response characteristics deriving from the use of resonant circuits, which can be designed to produce the desired control effect within a relatively narrow temperature range. This does not mean, however, that I cannot use direct current, for the curves of Fig. 2 show that even at 255° F. nylon has a comparatively low D.-C. resistance. At control temperatures above 255° F. the conduction of current through the control layer at normal potentials may readily be used to create an effective shunt circuit, for example, to reduce the power of a relay coil to release the relay armature.

The control circuit of Fig. 3 is adaptable equally for alternating or direct current. The thermosensitive element hereinafter designated 20, is independent of the load 21, and the respective electrodes 11, 14 of said element are connected in series with the coil 22 of a relay 23. The coil has known pull-in and release voltage levels. When the coil is energized, core 24 pulls in the armature 25 against the tension of the spring 26 to bridge the contacts 27 in series with the load circuit. Limiting resistor 28 establishes a normal operating voltage somewhat below the pull in voltage of the coil, said resistor being in series in the holding circuit for the relay, as is obvious. Inasmuch as the contacts 27 are normally open I provide a manually operable switch 30 to complete the relay coil circuit for beginning operation. Similarly, in order to de-energize the relay coil when desired, I provide a manual switch 31 which shunts the relay 23 out of the circuit.

It will be understood that thermosensitive element 20 is in heat-transfer relation with the load 21, which may be any electrically energized device. Under what may be termed "normal" conditions of temperature of the load, the temperature of the organic control layer 12 of the thermosensitive element 20 is such that said layer is an insulator; but should the load produce an overheat condition and even a relatively small length of the control layer rise to the control level of temperature, as fully described in the aforesaid Spooner et al. application, the insulating value of the layer at such point decreases to such an extent that current will flow from the electrode 11 directly to the electrode 14 and thence through resistor 28 to the ground side of the power circuit, shunting out the relay coil so that its strength drops below the level necessary to hold in the armature 25 against the action of spring 26. The load circuit will thereupon be interrupted and will remain so until the starting switch 30 is again actuated. It will be observed that the circuit is "fail safe." If any of the conductors in the thermosensitive circuit are open, the coil 22 will de-energize. Also, so long as the control layer remains at the control temperature, it is impossible to energize relay 23 even though the switch 30 be held closed because of the obvious shunt path from conductor 11 to 14 and through the closed switch 30 to ground.

Fig. 4 shows a lockout overheating control similar to the circuit of Fig. 3 except for the inclusion of a capacitor 32 in series with the coil 33 of relay 34. This series inductance-capacitance relationship establishes a resonance circuit which produces an induced voltage of substantially higher magnitude than the input voltage. At conventional 115 volt, 60 cycle A.-C. line voltage, the resonant voltage may be of the order of 150. In such a circuit the relay is selected to pull in at a somewhat lower voltage, for example 130 volts, and to release when impedance change of the control layer loads the control circuit and flattens the induced voltage peak. As the result of such impedance change and resulting off-resonance condition, the voltage available at the relay coil may be of the order of 75 volts, which is insufficient to hold the armature in closed circuit position. In the Fig. 4 circuit the resistor 35 establishes the induced voltage at a desired holding voltage for the coil, for example, 130 volts. The load circuit becomes connected to power when armature 36 bridges the contacts 37, and remains connected until a portion of the control layer 12 increases to the control level of temperature, at which the resulting drop in impedance and current flow between conductors 11 and 14 so loads the resonance circuit as to make the same go off resonance, with consequent flattening of the resonance peak to below the hold level of the relay, which will thereupon release. Switches 30, 31 are for the purpose noted in Fig. 3.

Typical circuit constants for Fig. 4 comprise 90,000 ohms reactance for coil 33, 0.1 mfd. capacitance of capacitor 32, and under 500 ohms for each of electrodes 11, 14. Resistor 35 may be of the order of 12,000 ohms. The circuit of Fig. 4 has fail safety similar to that of Fig. 3, with the further observation that short circuiting of capacitor 32 will throw the circuit off resonance with the resulting release of relay 34. It will also be observed that if switch 30 is deliberately held in to circumvent the overheat control, resistor 35 will be in series with the load, cutting down the current in the load circuit. Resistor 35 can be so sized with respect to the load as to make the load inoperative for its intended purpose.

Fig. 5 is a modification of Fig. 4, to provide a cycling control in which the load relay will release on an overheat condition and pull in again when the thermosensitive structure returns to normal temperature. A resonant circuit which includes the respective electrodes 11 and 14 in series with the reactor relay 34 and capacitor 32 creates an induced voltage sufficiently high to operate the relay, and thus to cause armature 36 to bridge the load circuit contacts 37. When the impedance of the control layer 12 decreases upon increasing temperature, the resulting loading of the resonance circuit reduces the voltage peak to a level incapable of holding the relay in, whereupon the armature 36, being spring biased, disengages from contacts 37. The connection of the control circuit to ground is such that restoration of resonance with drop in temperature of the control layer will re-energize the relay coil to the pull-in level. A manual switch 38 may be provided for manually disconnecting the load from the power source.

The circuit of Fig. 6 utilizes a glow switch relay 40 in lieu of the electromagnetic relay previously described and therefore requires a separate reactance such as the 75 henry choke 41 which is in series with the respective electrodes 14 and 11, and the 0.1 mfd. capacitor 42. The relay comprises a gas filled envelope 43 within which are sealed a discharge electrode 44, a bimetallic electrode 45 having a contact 46, and a fixed contact 47 which is connected to the "ground" power conductor. When the bimetallic electrode is cold its contact 46 withdraws from the fixed contact 47 and opens the load circuit, as will be obvious. It is therefore necessary for the bimetal to be brought to a suitable elevated temperature for engagement of the contacts and to be held at said temperature to maintain the load circuit. The necessary temperature may be obtained by glow discharge between the electrodes 44 and 45, and it will thus be seen that control of load 21 is effected by control of the potential level of electrode 44. This is advantageously accomplished by connecting said electrode into a resonance circuit in which the induced voltage at resonance will effect and maintain discharge.

The control circuit is activated by closing the normally open switch 48, as the result of which the circuit is completed from the power source through electrode 11, capacitor 42, electrode 14, choke 41 and switch 48 to ground. The circuit constants are such that a peak resonance voltage of 150 volts is created with 60 cycle, 115 volt input. The electrodes 44 and 45, being connected across the reactor 41 are then at the resonance voltage and discharge occurs between them. After an interval, the bimetallic electrode 45 will heat to a point at which its contact engages with the fixed contact 47 to complete the load circuit aforementioned. The completion of the load circuit may be indicated by a neon lamp 50 which is connected as shown from one side of the power source through the bimetal 45 and contacts 46, 47 to ground. When the neon lamp glows the switch 48 may be released. So long as lamp 50 remains illuminated the operator of the circuit is apprised that the load 21 is in circuit with the power source.

Resonance is maintained so long as the temperature of the control layer 12 is substantially below the control point. However, should its temperature increase with corresponding reduction in impedance to the point at which conduction occurs through the control layer between the electrodes 11 and 14, the capacitor 42 will be effectively shunted out and the resonance voltage will drop from its peak to a level insufficient to keep the glow switch firing. After an interval, the cooling of the bimetal element 45 will disengage the contacts 46 and 47 and the load circuit will be broken. It will be observed that the glow relay provides lockout overheat control in that the resonant circuit is not self-restoring after the control layer temperature returns to normal. The load circuit may be reconnected only by again closing switch 48 and will remain connected upon release of said switch only if the control layer temperature has dropped sufficiently from the cut-off temperature. When it is desired to manually disconnect the load 21 it is necessary only to close the normally open switch 51 which, as will be obvious, shunts the choke 41 out of the circuit and effectively disrupts the resonance circuit. Fail safety, as respects the breaking or short circuiting of any of the control circuit components, is apparent. So long as the condition productive of the high temperature condition persists, the control will open the load circuit whenever the control layer rises to the level at which cut off is desired Therefore to protect against an attempt by the user to circumvent the control by holding switch 48 manually closed I provide a resistor 52 which is in series with the load when switch 48 is closed. Resistor 52 should be much larger than the load resistance, so as to reduce the current in the load circuit to such a point that the load will not produce any substantial temperature rise. In an electric blanket, where the load would constitute the heater wire, it will be about 60 ohms, and resistor 52 will be of the order of 3000 ohms.

The exact nature of the load 21 of the previous circuits has purposely been left indefinite, so as to represent another relay, a motor starting switch, or in fact any device or machine drawing electric current within the capacity of the respective control circuit relays. The load as such may not be responsible for the heat rise, or at most, only indirectly so. The circuits of Fig. 7 and 8 are typical of application to overheat protection of electric blankets or the like, and in each of them, the inner conductor 11 of the thermosensitive element is used as the blanket heater and thereby constitutes the load, and the outer conductor 14 is the signal wire. Current to the heater wire of the blanket is normally controlled in response to room temperature by a cycling control device 60 described and claimed in the U. S. patent to William K. Kearsley, No. 2,195,958, April 2, 1940. It will be understood that in a blanket the combined thermosensitive and heater element 20 preferably will be distributed in a series of convolutions over the blanket area to be heated, and may be run in passages provided for it as described in Patent No. 2,203,918, issued June 11, 1940 to I. O. Moberg. As shown, the electrical system within the blanket B is connectible by the multi-terminal plug and socket 61 to the control system, which is housed within a suitable control box (not shown). Plug P affords connection to the power source, for example the conventional 115 volt. 60 cycle, A.-C. domestic circuit. In Fig. 7, the load circuit conductor 11 is arranged in two sections, as shown, to be connected in parallel to the external electrical supply source; the resistance of the load circuit will be of the order of 60 ohms. The outer conductor is the overheat protective signal wire, and the control layer may be a .006 inch film of one of the organic materials disclosed in the said Spooner et al. application S. N. 91,396, nylon being preferable. Overheat protection is afforded by utilizing the change in impedance of the organic material as the electrical responsive characteristic at the control temperature level, and is provided by a work device such as the lockout relay 62; and the cycling control, responsive to room temperature, of the aforementioned Kearsley control is provided by the bimetallic switch 63 having a suitable external control knob 64. The operating coil of relay 62 is connected across an impedance bridge consisting of 0.1 mfd. capacitor 65 in a resonant circuit with a 75 henry choke 66, the other two legs of the bridge being the resistors 67, 68, of about 6800 ohms each. The coil impedance of relay 62 should be of the order of 90,000 ohms. The induced voltage of the resonant circuit, available at relay 62, is approximately 130 volts; said relay will pull in somewhat below that level, but will drop out at about 75 volts. Assuming that the Kearsley control 60 is "calling for heat" and its contacts are closed, power can be applied to the blanket heater wire 11 by momentarily closing the normally open switch 70 which will complete the resonance circuit from the power source, through the signal wire 14, which in this instance preferably has a resistance of about 400 ohms and is in series with the center of the resonance circuit of choke 66 and capacitor 65, and switch 70 to ground. The resultant induced voltage will energize relay 62 to bridge its contacts 72 and complete the operating circuit for the heater wire. The 6800 ohm resistors 67, 68 provide a voltage divider circuit such that if a dead short occurred across the extremities of conductors 11, 14 while relay 62 was in, the voltage in the relay coil would drop to about one half line voltage, whereupon the relay would drop out and open the load circuit. In normal operation, both the resonant circuit and the power circuit are completed through relay contacts 72. Voltage limiting resistor 71 is now in the resonance circuit, to establish the relay holding voltage. Neon lamp 73 is energized through a circuit including a 200,000 ohm resistor 74, and indicates that the blanket is in operation. The blanket will now remain in operation, subject only to the periodic cycling of thermostat 63 so long as the temperature of the control layer 12 remains below the cut-off temperature. The resonance of the control circuit is not affected by the operation of thermostat 63 and relay 62 will hold in. A rise in temperature of the control layer is accompanied by a drop in impedance, as shown in Fig. 2, in the area of temperature increase, thereby loading the control circuit to cause it to go off resonance. Resulting from the off-resonance condition, the voltage at relay 62 will drop to a level below that necessary to hold it in the load circuit will be interrupted. Normal operation may be restored by again momentarily closing the switch 70, providing, however, that the temperature of the thermostatic device has fallen sufficiently below the control level. To purposely open the load circuit, there is provided a normally open switch 75, shunted across the relay 62. When switch 75 is closed the relay coil is deenergized, and relay contacts 72 will be opened.

It will be noted that failure of any of the component parts of the control circuit will deenergize the relay coil 62 by destroying the circuit resonance. The resistor 71 which is placed in series with the load wire 11 when switch 70 is manually closed is effective to reduce the current flow through the load conductor to such an extent that even if the switch 70 were held closed continuously in an attempt to circumvent the control circuit, there would be no appreciable heating of the blanket.

Fig. 8 shows a cycling overheat control. The inner conductor 11 of the thermostatic element comprises the heater electrode for the blanket. As in Fig. 7, the heater electrode 11 is connected to the power source through the Kearsley thermostatic cycling switch 60 and a relay 80 whose armature 81 is held normally open with respect to a contact 82 by a spring 83 or equivalent.

The coil of relay 80 is in series with signal conductor 14 and capacitor 84; the reactance of the relay coil and impedance of the condenser are matched under normal temperature of control layer 12 to form a resonant circuit. A manually operable switch 85 initially completes the resonance circuit whereupon the induced peak voltage at the relay 80 pulls in the armature to engage with contact 82 and complete the load circuit. Neon lamp 86 will be connected to the power source as the relay pulls in, signifying that the blanket is "on." If any point of the blanket should overheat so as to raise the temperature of the control layer 12 to a point where it will conduct between electrodes 14 and 11 the resulting loading of the resonant circuit will reduce the voltage at relay 80 to below its hold level, and the armature will be drawn away from its associated contact, interrupting the circuit to the heater electrode 11, and concurrently extinguishing the glow lamp 86.

Fig. 9 is typical of an alarm circuit, and has been purposely selected to show an installation in which the load consists only of a signal S, to be operated when the control layer 12 of the thermosensitive element 20 reaches a predetermined temperature. The element 20 may be run about the walls of a room or drying oven, for example, or disposed within a coal pile or grain bin to respond to temperature rise thereof.

A resonance circuit has been chosen, although the simple shunt circuit of Fig. 3 may be used, particularly where the operating temperature may be high—for example 350°–400° F.—as in drying ovens. At such temperatures, the direct current resistance of nylon is very low. However, assuming in Fig. 9 that the power source is 115 volt, 60 cycle, A.-C., reactor relay 90 and capacitor 91 are in a series circuit including the windings 11, 14. Relay 90 is presumed to drop out by gravity, and when de-energized below its hold-in level, its armature 92 will bridge contacts 93 to energize signal S. The circuit is initially completed by closing a manual switch 94, whereupon the induced voltage of the resonance circuit will pull in the relay armature and open the signal circuit. So long as the temperature of the control layer remains within a range in which the control layer is substantially an insulator, the circuit remains resonant, and the relay 90 holds in. Should the control layer temperature increases to an electricity conducting level, the resonance circuit will be loaded to the extent that the circuit will go off resonance and the voltage at relay 90 will drop to below the hold in point, thus closing the signal circuit.

Although the circuits disclosed herein are not limited to use with the specific form of thermosensitive device shown herein by way of example, I consider that such a thermosensitive device complements the advantages inherent in resonant circuits. The resonant control circuits herein have a voltage stabilization effect pursuant to which the voltage remains at a high level until a relatively abrupt change occurs in the electrical characteristic of the control layer material, whereupon the control circuit voltage will also fall off sharply. Without a resonant circuit, the relay coil voltage will tend to follow the slope of the control layer resistance curve, and hence reduce gradually. This is undesirable because of the probable rather wide spread of temperatures at which the relay may drop out. The Spooner et al thermosensitive device has a substantial advantage over devices using merely the change of resistance with temperature of a signal conductor, for example, in that in the former the effect of heating any portion of the device is to add a great many individual resistance or impedance elements in parallel in the circuit, with greater control circuit influence than in the latter, in which the heating effect is merely to add a new resistance value in series with that of the rest of the signal conductor.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim to be new and desire to secure by Letters Patent of the United States is:

1. In combination with a load circuit switch and electrically energized means effective upon energization to a predetermined magnitude to actuate said switch to a first circuit condition against a bias effective upon drop in said energization to actuate said switch to a second circuit condition, a control impedance comprising a pair of conductors having between them in coextensive intimate contact therewith an ambient temperature sensitive control layer of material which is substantially an insulator at one temperature but sufficiently conducting at another temperature to pass significant current, a first circuit connecting at least one of said conductors and said switch actuator means in series across a source of potential of such magnitude as to establish said predetermined value of energization, and a second circuit connecting said control impedance across said source of potential to constitute a parallel circuit about said electrically energized means upon attainment of conducting status of said layer, said second circuit being effective to reduce the magnitude of energization in the said actuator means under said conducting conditions to release said switch for operation to its second circuit condition.

2. In combination with a switch for controlling a load circuit which generates substantial heat incident to the passage of current therethrough and electromagnetic means effective upon energization to a predetermined magnitude to actuate said switch to a first circuit condition against a bias effective upon drop in said energization to actuate said switch to a second circuit condition, a control impedance comprising a pair of conductors having between them in coextensive intimate contact therewith an ambient temperature sensitive control layer of material which is substantially an insulator at one temperature but sufficiently conducting at another temperature to pass significant current therebetween, one of said conductors constituting an element of said load circuit, a first circuit connecting said one conductor and said switch actuator means in series across a source of potential of such magnitude as to establish said predetermined value of energization, and a second circuit connecting said control impedance across said source of potential to constitute a parallel circuit about said electrically energized means upon attainment of conducting status of said layer, said second circuit being effective to reduce the magnitude of energization in the said electromagnetic actuator means under said conducting conditions to release said switch for operation to its second circuit condition.

3. A control circuit including a control impedance comprising a pair of conductors having between them a layer of material which is substantially an insulator at one temperature and at a predetermined higher temperature a conductor of electricity of conventional domestic voltage and frequency; an impedance bridge connected across a source of such electric power, two legs of said bridge comprising matched resistors and the other two legs collectively including in serial relationship reactance means, one of the conductors of said control impedance, and a capacitor; a work device biased to one operating position upon energization of said coil to a predetermined magnitude; means connecting said electromagnetic coil across said impedance bridge to derive the required energy therefrom to operate said work device to a second operating position; and a circuit connecting said control impedance across said source of potential to constitute a parallel circuit about two of the legs of said impedance bridge upon attainment of conducting status of said layer, said last-named circuit being effective to reduce the magnitude of energization in said electromagnetic coil to release said work device for operation thereof to its first-named position.

4. A temperature responsive control system comprising a circuit opening and closing device having contacts adapted for controlling a load circuit and biased to restore to one circuit condition; operating means responsive to a relatively high voltage to operate said device to another circuit condition and maintain the same thereat against the said bias; a circuit including a first conductor and said operating means; a resonance establishing means connected in said circuit; means for connecting said circuit across a power source of voltage and frequency to energize said resonance establishing means to a predetermined magnitude effective to induce in said circuit the aforesaid relatively high voltage; a second conductor connected across said power source in parallel relation with said resonant circuit; and an ambient temperature responsive control layer of temperature sensitive material disposed in coextensive intimate contact between said first and second conductors, said control layer being substantially an insulator at one temperature and a conductor at another temperature, whereby upon the attainment of said conducting temperature a circuit including said first and second conductors will be completed across said power source shunting said resonance establishing means to effect change in the said predetermined magnitude of energization thereof and thereby to load said resonance circuit to reduce the voltage induced therein below said operating level.

5. A temperature sensitive control system comprising a circuit opening and closing device having contacts adapted for controlling a load circuit and biased to restore to one circuit condition; operating means responsive to relatively high voltage to operate said device to another circuit condition and maintain the same thereat against said bias; an operating means energizing circuit including a first conductor and resonance establishing means in series therewith; means for connecting said energizing circuit across a power source of proper frequency and voltage to energize said resonance establishing means to induce in said circuit the aforesaid relatively high voltage; a second conductor connected across said power source; and an ambient temperature responsive layer of temperature sensitive material disposed in coextensive intimate contact between said first and second conductors, said control layer being substantially an insulator at one temperature and a conductor at another temperature whereby upon the attainment of said conducting temperature a circuit including said first and second conductor will be completed across said power source shunting said resonance establishing means to effect change in the said energization thereof and thereby to load said resonance circuit to reduce the voltage induced therein below said operating level.

6. A control circuit according to claim 5 in which the circuit opening and closing device comprises a normally open eletromagnetically operated relay and the operating means in said resonant circuit comprises the electromagnetic coil of said relay.

7. A control circuit according to claim 5 in which the circuit opening and closing device comprises a relay having an eletromagnetic coil, said coil being in series with a capacitor to produce the induced resonant voltage.

8. A control circuit as in claim 5 in which the circuit opening and closing device comprises a glow tube relay whose operating means comprises a pair of electrodes responsive to said relatively high voltage to produce a glow discharge between them, said relay having load circuit controlling contacts adapted to be closed upon the occurence of said glow discharge.

9. A control circuit as in claim 5 in which the circuit opening and closing device comprises a glow tube relay having within a common envelope a pair of load-circuit controlling contacts and a pair of electrodes responsive to said relatively high voltage to produce a glow discharge between them, the said load circuit contacts including a bimetallic member movable into closed circuit condition upon the occurrence of said glow discharge and the temperature rise produced thereby.

10. In combination with a load circuit switch and electromagnetic means effective upon energization to a predetermined magnitude to actuate said switch to a closed circuit condition against a bias effective upon drop in said energization to actuate said switch to an open circuit condition, a control impedance comprising a pair of conductors having between them in coextensive intimate contact therewith an ambient temperature sensitive control layer of temperature sensitive material which is substantially an insulator at one temperature but sfficiently conducting at another temperature to pass significant current, a first circuit including said load circuit switch connecting at least one of said conductors and said electromagnetic means in series across a source of potential of such magnitude as to establish said predetermined value of energization; manually controllable switch means for temporarily bridging said load circuit switch to complete said first circuit when said load circuit switch is in open condition; and a second circuit connecting said control impedance across said source of potential to constitute a parallel circuit about said electromagnetic means upon attainment of conducting status of said layer, said second circuit being effective to reduce the magnitude of energization of said electromagnetic means under said conducting conditions to release said load switch for operation to open circuit condition.

11. A control circuit according to claim 10 in which the second conductor of said control impedance constitutes at least a part of said load circuit.

12. A control circuit according to claim 10 in which the second conductor of said control impedance comprises an electric heating element.

13. In combination with a load circuit switch and electromagnetic means effective upon energization to a predetermined magnitude to actuate said switch to a closed circuit condition against a bias effective upon drop in said energization to actuate said switch to open circuit condition, a control impedance comprising a pair of conductors having between them in coextensive intimate contact therewith an ambient temperature sensitive control layer of material which is substantially an insulator at one temperature but sufficiently conducting at another temperature to pass significant current; a first circuit including said load switch and said electromagnetic means in series with one of said conductors across a source of potential of predetermined voltage and frequency; resonance establishing means in said first circuit to induce therein said predetermined magnitude of energization of said electromagnetic means; a second circuit including manually operable switch means bridging said load circuit switch to complete said resonant circuit in the circumstance that said load circuit switch is open; and a third circuit connecting said control impedance across said source of potential to constitute a parallel circuit about said resonance establishing means upon attainment of conducting status of said layer, said third circuit effective under said conducting conditions to reduce the energization of said electromagnetic means to release said load circuit switch for operation to its open circuit condition.

14. A control circuit according to claim 13 in which said third circuit has a resistance substantially higher than the resistance of the load circuit.

GEORGE C. CROWLEY.

REFERENCES CITED

The following references are of record in the file of this patent:

UNITED STATES PATENTS

| Number | Name | Date |
|---|---|---|
| 603,594 | Cutler | May 3, 1898 |
| 862,740 | Kallmann | Aug. 6, 1907 |
| 1,325,048 | Simon | Dec. 16, 1919 |
| 1,934,531 | Guettler | Nov. 7, 1933 |
| 2,123,063 | Peters | July 5, 1938 |
| 2,334,530 | Andrews | Nov. 16, 1943 |
| 2,413,125 | Walbridge | Dec. 24, 1946 |
| 2,448,470 | Rypinski | Aug. 31, 1948 |

FOREIGN PATENTS

| Number | Country | Date |
|---|---|---|
| 338,880 | Great Britain | Nov. 18, 1930 |